United States Patent
Subramanian et al.

(10) Patent No.: US 9,063,854 B1
(45) Date of Patent: Jun. 23, 2015

(54) SYSTEMS AND METHODS FOR CLUSTER RAID DATA CONSISTENCY

(75) Inventors: Srikumar Subramanian, Newark, CA (US); Sankarji Gopalakrishnan, Fremont, CA (US); Paresh Chatterjee, Fremont, CA (US); Udita Chatterjee, legal representative, Kolkatta (IN)

(73) Assignee: American Megatrends, Inc., Norcross, GA (US)

( * ) Notice: Subject to any disclaimer, the term of this patent is extended or adjusted under 35 U.S.C. 154(b) by 343 days.

(21) Appl. No.: 13/450,065

(22) Filed: Apr. 18, 2012

Related U.S. Application Data (60) Provisional application No. 61/476,427, filed on Apr. 18, 2011.

(51) Int. Cl.
*G06F 11/00* (2006.01)
*G06F 11/07* (2006.01)

(52) U.S. Cl.
CPC .................... *G06F 11/073* (2013.01)

(58) Field of Classification Search
CPC . G06F 3/0689; G06F 3/0619; G06F 11/1092; G06F 11/1096; G06F 2211/1035; G06F 3/0617; G06F 3/0644; G06F 3/0647; G06F 11/1008; G06F 17/30067; G06F 17/30156; G06F 2211/1059; G06F 2211/1061; G06F 3/0643; G06F 3/065

USPC .......................................... 714/6.22–6.24, 6.3
See application file for complete search history.

(56) References Cited

U.S. PATENT DOCUMENTS

| | | | | |
|---|---|---|---|---|
| 7,055,058 | B2 * | 5/2006 | Lee et al. | 714/6.32 |
| 7,743,210 | B1 * | 6/2010 | Jernigan et al. | 711/114 |
| 7,747,584 | B1 * | 6/2010 | Jernigan, IV | 707/692 |
| 8,255,739 | B1 * | 8/2012 | Chatterjee et al. | 714/6.1 |
| 2004/0205387 | A1 * | 10/2004 | Kleiman et al. | 714/6 |
| 2006/0271605 | A1 * | 11/2006 | Petruzzo | 707/201 |

* cited by examiner

*Primary Examiner* — Bryce Bonzo
*Assistant Examiner* — Elmira Mehrmanesh
(74) *Attorney, Agent, or Firm* — Meunier Carlin & Curfman, LLC (57) ABSTRACT

A first RAID module is added to a first RAID controller and a second RAID module is added to a second RAID controller. An array of physical disks is partitioned into two partitions across the array of physical disks. The first partition is assigned to the first RAID module and the second partition is exposed to the second RAID module. Each of the RAID modules exposes their respective partitions to their associated RAID controller as a single array. Each RAID module further receives I/O from its respective RAID controller, and translates the I/O to access its associated partition.

17 Claims, 3 Drawing Sheets

SYSTEMS AND METHODS FOR CLUSTER RAID DATA CONSISTENCY

CROSS-REFERENCE TO RELATED APPLICATION

This application claims the benefit of U.S. provisional patent application No. 61/476,427, filed on Apr. 18, 2011, and entitled "Systems and Methods for Clustering RAID" which is expressly incorporated herein by reference in its entirety.

BACKGROUND

To provide increased resiliency to against data failures and failures of a RAID controller, the use of clustered RAID configurations are becoming more popular. One type of cluster RAID is known as ACTIVE-STANDBY. In ACTIVE-STANDBY, one RAID controller is an active controller, and the other RAID controller is a standby controller. The active controller fields all I/Os to the disk subsystem. In the event that the active controller fails, the standby controller fields the I/Os to the disk subsystem. Another type of cluster RAID is known as ACTIVE-ACTIVE RAID. In ACTIVE-ACTIVE RAID, both controllers are active controllers and both controllers can take over for each other in the event of a controller failure.

For RAIDs an I/O from the OS layer can be said to have been completed only if all the I/O generated by the RAID stack is written to the disk. For example, for an I/O read to a disk, the I/O is completed after the write is performed, and any parity data is written. When an I/O is interrupted before it is completed, there may be holes in one or more stripes of the array. For example, it may be unclear whether the parity was successfully written to the disk before the interruption. For cluster RAIDS, any holes in one or more stripes must be completed before the array can be restarted or the secondary controller can take over operation of the array.

SUMMARY

A first RAID module is added to a first RAID controller and a second RAID module is added to a second RAID controller. Communication channels are created between the first and second RAID modules. I/Os are intercepted by the first RAID module and any stripe that is to be written to is added to an open stripe table. The entries in the open stripe table for a first RAID module are replicated to the open stripe table for the second RAID module. The open stripe table may also be written to disk. In the event of an interruption or a failure of either of the first or second RAID controllers, the open stripes can be closed using the open stripe tables stored by either of the first or second RAID modules without reading from disk. In the event of a failure of both the first and second RAID controllers, the open stripe table stored on the disk may be used to close the open stripes.

DETAILED DESCRIPTION

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing improved performance in RAID system.

Figure 1:
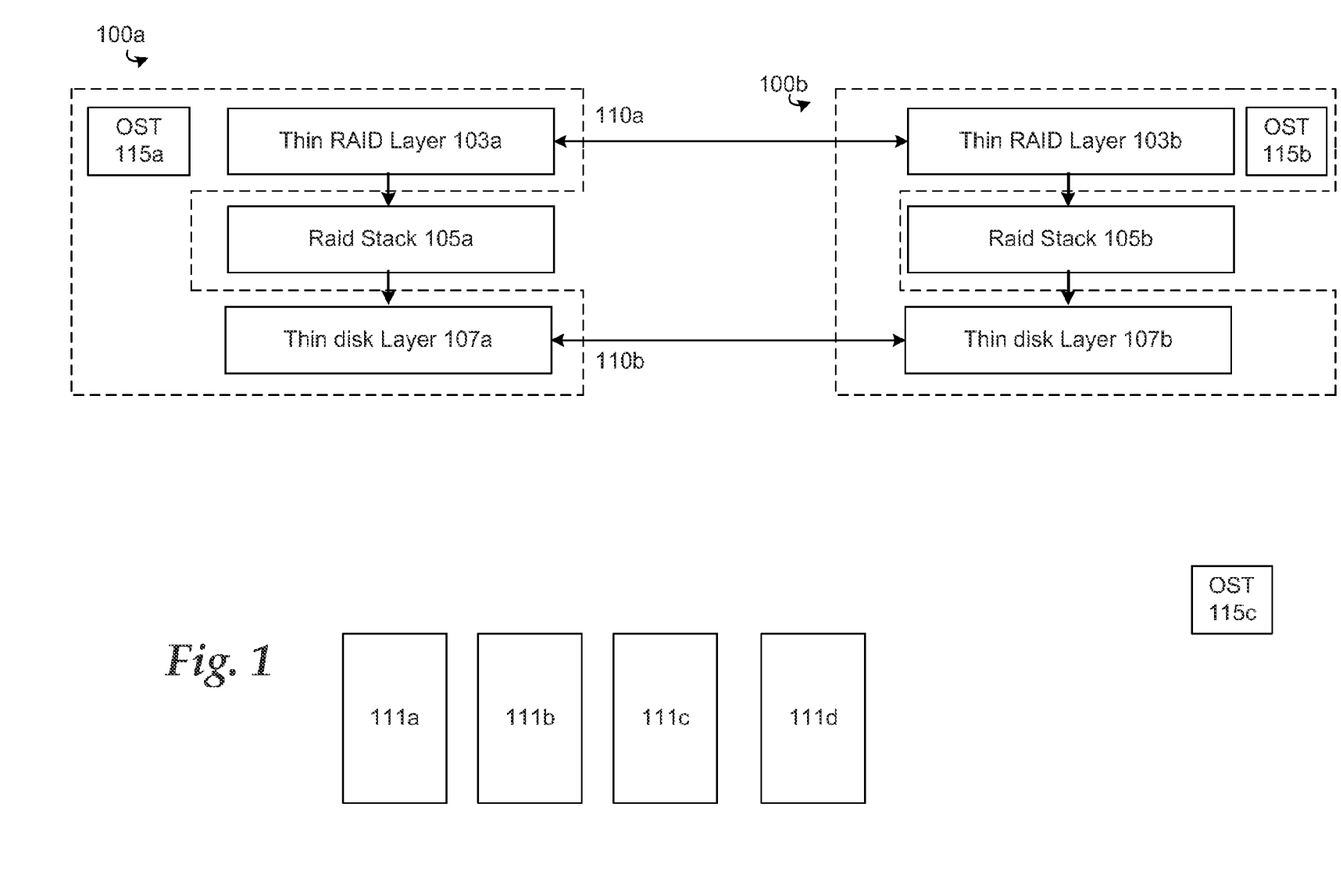
FIG. 1 is a diagram showing an illustrative operating environment for the use of a module in a RAID system.

Turning now to FIG. 1, details will be provided regarding what is referred to herein as a module 100. In particular, two module 100s (e.g., modules 100a and 100b) are illustrated. Each module 100 may be a software module and may be added to existing RAID controllers. For example, each module 100 may be a software plug-in to an existing RAID system. As shown, each module 100 may include a thin RAID layer 103, and a thin disk layer 107. However, more or fewer components may be supported.

In particular, each module 100 may act as multiple intermediate layers between a RAID stack 105 of a RAID controller and a plurality of volumes 111a, 111b, 111c, and 111d. The volumes 111a-111d may form an array. In the example shown, the volumes 111a-111d may form a RAID-5 array. However, other types of RAID configurations may be used including, but not limited to, RAID-0, 1, 2, 3, 4, 6 etc. Moreover, more or fewer volumes 111a-111d may be supported. In some implementations, the volumes 111a-111d may each comprise a physical hard disk drive. Other types of volumes may be used such as network volumes, virtual volumes, and logical volumes.

The modules 100a and 100b may be used to provide cluster RAID support to existing RAID controllers. Each RAID stack 105 of each RAID controller may be unaware that it is part of a multi-controller cluster array. In some implementations, the RAID controllers may form an ACTIVE-ACTIVE cluster array, and in other implementations the RAID controllers may form an ACTIVE-PASSIVE cluster array.

The modules 100 may each include a thin disk layer 107 and a thin RAID layer 103. The thin RAID layers 103 may receive/intercept I/Os sent between an operating system or application layer and the RAID stacks 105. The thin disk layers 107 may receive/intercept I/Os sent between the RAID stack 105 and the volumes 111a-111d.

In some implementations, each of the modules 100 may include and maintain an open stripe table 115. For example, the module 100a may maintain an open stripe table 115a, and the module 100b may maintain an open stripe table 115b. In addition, an open stripe table 115c may be maintained on one or more of the volumes 111a-111d. The open stripe tables 115a and 115b may be maintained in memory by their respective module 100, while the open stripe table 115c may be written to a physical disk.

The modules 100 may log open stripes in their respective open stripe table 115 when an I/O is received for a stripe. For example, the thin RAID layer 103a of the module 100a may receive a write I/O from an operating system. Accordingly, the thin RAID layer 103a may determine the stripe from the volumes 111a-111d associated with the write I/O and may add an indicator of the stripe to the open stripe table 115a. In some implementations, the open stripe table 115a may also include a copy of the stripe before the write I/O is applied.

After updating the open stripe table 115a, the thin disk layer 103a may communicate the changes made to the open stripe table 115a to any other modules 100 associated with the cluster raid through a communications link 110a. Any thin disk RAID layers 103 associated with other clusters 100 (i.e., the thin RAID layer 103b) may receive the changes and make the corresponding changes to their open stripe table 115. In some implementations, the thin RAID layers 103 may communicate updates made to their open stripe table 115 to other thin RAID layers 103 immediately as they occur. In other implementations, the thin RAID layers 103 may collect updates to their open stripe table 115 and may send the updates to the other thin RAID layers 103 in batches or groups.

The communications link 110a (and also the communications link 110b) may be implemented using a variety of networking and communications means. In some implementations, the communications link 110a may be used by the thin RAID layers 103 to communicate with other thin RAID layers 103, and the communications link 110b may be used by the thin disk layers 107 to communicate with other thin disk layers 107. While the communications links 110a and 110b are shown as separate links, they may be implemented using the same networking or communications means, for example.

In some implementations, after updating the open stripe table 115, and communicating the updates to the open stripe table 115, the thin RAID layer 103 may pass the received write I/O to the RAID stack 105. The RAID stack 105 may then pass the I/O to the volumes 111a-d for fulfillment. After the stripe associated with I/O has been written, the volumes 111a-d may pass a confirmation message back to the RAID 105 and the RAID 105 may provide the same or a similar confirmation message to the operating system or application layer. In addition, one or both of the thin RAID layer 103 and the thin disk layer 107 may view the confirmation message, and may remove the entry for the stripe associated with the entry from the open stripe table 115 indicating that the stripe was closed successfully and is now no longer open. In some implementations, a message indicating that the stripe was removed from the open stripe table 115 may be communicated to the various modules through the communication links 110a and/or 110b.

As can be appreciated, the open stripe tables 115 of the various modules 100 and the volumes 111a-d are maintained in sync with one another by the thin RAID layers 103. Such synchronization provides several advantages in a clustered RAID. First, when an L/O is received/intercepted by the thin RAID layer 103, the thin RAID layer 103 may first see if the I/O is associated with an open stripe in the open stripe table 115. If it is, the thin RAID layer 103 may wait until the stripe is closed before it passes the I/O to the RAID stack 105. Thus, the open table 115 and the thin RAID layer 103 may act as a locking mechanism for stripes of the clustered RAID.

A second advantage that the open stripe table 115 of the modules 100 provides to the clustered RAID is rapid recovery in the case of an outage of the array or the failure of one or both of the RAID controllers associated with the array. With respect to an outage, when the array is in an optimal state (i.e., no drives have failed or are being recovered), the RAID may have an outage from a power loss. When the RAID comes back online, the module associated with the primary RAID controller, for example the module 100a, may look at the open stripe table 115a to determine which stripes were open during the outage. The module 100a may then close the open stripes before receiving further I/Os to the cluster RAID. In some implementations, the module 100a may close the open stripes by rewriting the parities for each open stripe. In some implementations, the parities may be calculated and rewritten based on the values in the open stripe table 115a rather than the values stored on the volumes 111a-d. The module 100a may further generate a message to inform a user or administrator that the I/Os associated with the open stripes may not have been completed correctly. As may be appreciated, because the open stripe table 115a is persisted in memory associated with the module 100a, the module 100a may close one or more open stripes without costly reads from the volumes 111a-d.

With respect to a failure of a primary RAID controller, when the array is in an optimal state, the RAID controller associated with the module 100a may fail. Accordingly, the controller associated with the module 100b may become the active controller. Before receiving further I/O from the operating system, the module 100b may look at the open stripe table 115b to determine which stripes were opened by the module 100a before it failed. As described above, the open stripe table 115b may be a copy of the open stripe table 115a maintained by the module 100a. The module 100b may then close the open stripes before receiving further I/Os to the clustered RAID. In some implementations, the parities may be calculated and rewritten based on the values in the open stripe table 115b stored in memory of the module 100b. Thus, costly reads from the volumes 111a-d are avoided by the module 100b allowing the secondary RAID controller to quickly close the open stripes and begin receiving and fulfilling I/Os from the operating system.

In the event of a failure of both the primary and secondary controllers, and the loss of both open stripe tables 115a and 115b stored in memory, any open stripes may be closed using the open table 115c stored in the volumes 111a-d. However, because the data necessary to close the open stripes is read from the volumes 111a-d, such a solution may require more time than solutions where the data is read from memory.

Figure 2:
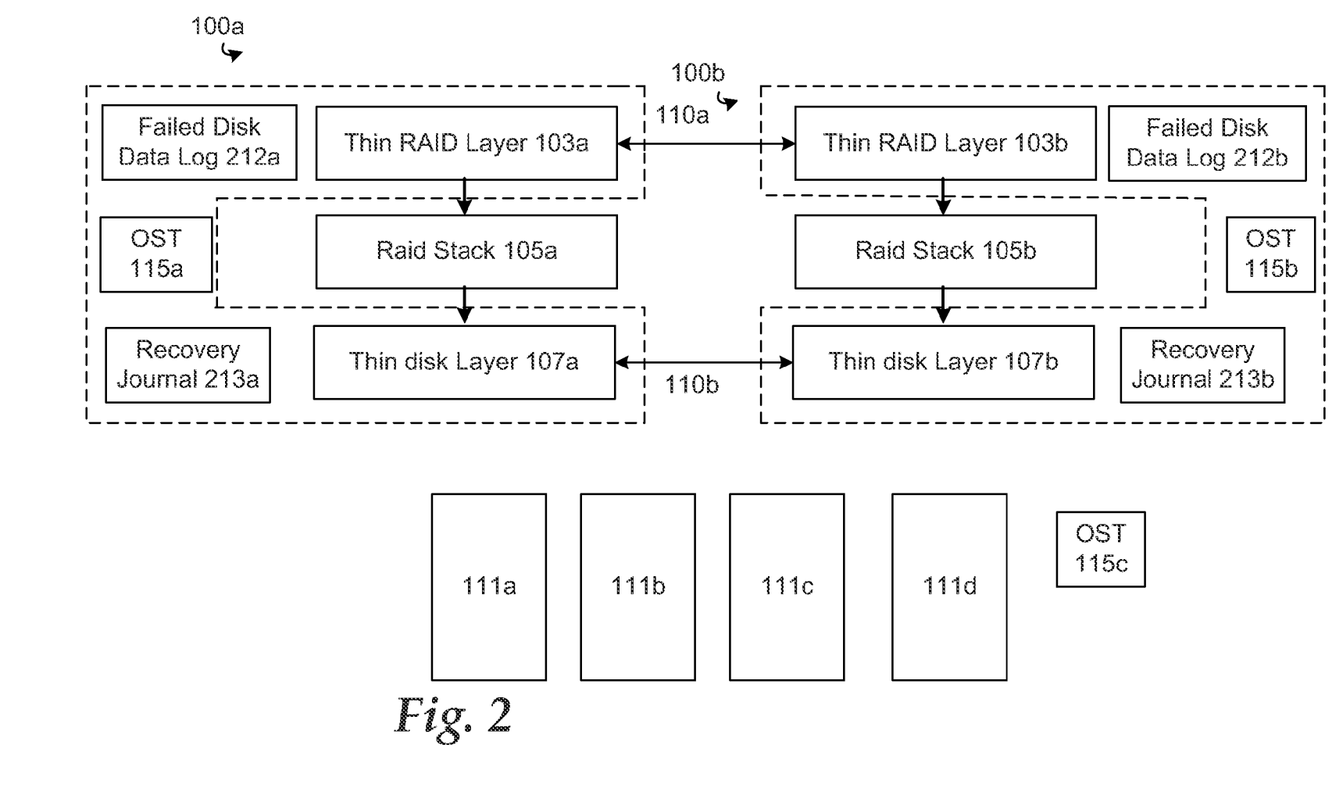
FIG. 2 is a diagram showing another illustrative operating environment for the use of a module in a RAID system.

Turning now to FIG. 2, another implementation of the module 100 is described herein. Similarly as to FIG. 1, two module 100s (e.g., modules 100a and 100b) are illustrated. Each module 100 may be a software module and may be added to existing RAID controllers. For example, each module 100 may be a software plug-in to an existing RAID system. As shown, each module 100 may include a thin RAID layer 103, and a thin disk layer 107. However, more or fewer components may be supported.

Unlike FIG. 1, the modules 100 have a failed disk data log 212 (i.e., failed disk data logs 212a and 212b), and a recovery journal 213 (i.e., recovery journals 213a and 213b). The failed disk data logs 212 may be maintained by the thin RAID layers 103 of the modules 100, and the recovery journals 213 may be maintained by the thin disk layers 107. In some implementations, similarly to the open stripe tables 115, all updates to the failed disk data logs 212 and the recovery journals 213 may be communicated and shared between the modules 100 through the communications lines 110a and b. Thus, the failed disk data logs 212a and 212b, as well as the recovery journals 213a and 213b, may be copies of one another.

The version of the module 100 illustrated in FIG. 2 may be configured to recover from an unclean shutdown with a failed volume 111a-d or other disk errors. Unlike in FIG. 1, where each volume in the array 111a-d were functioning correctly, in FIG. 2, one or more of the volumes 111a-d may have failed. Thus additional data from either the failed disk data logs 212 or the recovery journals 213 may be need to close any open stripes.

With respect to the failed disk data logs 212, the thin RAID layers 103 may log values for a degraded volume in the failed disk data logs 212. For example, the volume 111a of the array may have failed. Depending on the type of RAID used, any data that was stored in a chunk or portion of a stripe on the volume 111a can be reconstructed based on the data associated with the stripe that includes the chunk or portion on the remaining volumes 111b-d. Thus, when a read I/O is received for a stripe, the thin RAID layer 103 may determine the value for the stripe corresponding to the volume 111a (if it does not already exists in the failed disk data log 212) by reading data from the remaining volumes 111b-d for the same stripe. In particular, depending on the RAID configuration, the missing value may be the XOR of each remaining value of the stripe. After determining the value, the thin RAID layer 103 may log the value in the failed disk data log 212 and may return the value to the operating system or application that initiated the request.

With respect to a write I/O to a stripe of the volumes 111a-d, the thin RAID layer 103 may first calculate the value of the stripe for the failed drive 111a. The value for the stripe may be calculated based on the values for the stripe on the volumes 111b-d as described above, and written to the failed disk data log 212. The thin RAID layer 103 may then mark the stripe in the open stripe table 115 as open, and after the data is written to the volumes, including parity, by the RAID stack 105, the thin RAID layer 103 may mark the stripe closed on the open stripe table 115.

As may be appreciated, had a RAID controller failed or the RAID shutdown expectedly while the stripe was open, the module 100 may not have been able to close the open stripes (i.e., recalculate the parity) based on the data in the volumes 111a-111d and the open stripe table 115 alone. Because the array included a failed disk (i.e., volume 111a), additional data is needed to close the stripe. Thus, the module 100 may use the data from the failed disk data log 212, along with the data in the open stripe table 115 and/or the volumes 111b-d to close the stripe.

Alternatively, or additional, the recovery journals 213 may be used to provide support for an unclean shutdown to an array with a failed volume. When a write I/O is received by the thin RAID layer 103 the associated stripe in the array may be marked as open in the open stripe table 115 and the I/O is passed to the RAID stack 105. The RAID stack 105 may provide the I/O to the volumes 111a-d where it is intercepted by the thin disk layer 107.

Before the write I/O is performed by the volumes 111a-d, the new parity value that will result from the write operation is calculated for the effected stripe of volumes 111a-d, and the parity value and write data associated with the I/O are written to the recovery journal 213 in an entry associated with the stripe. The stripe may then be closed by writing the parity and new write data to the volumes 111b-d. Because the data is written to the recovery journal 213 before the stripe is closed, in the event of an outage, or a failed controller, any open stripes can be closed using the data written to the recovery journal 213.

Using the failed disk data log 212 and recovery journal 213 as described above may allow for the recovery of a clustered array with a failed disk, but may also provide additional complexities to the operation of the RAID. For example, with respect to the failed disk data log 212, the data associated with the failed is first calculated from the disks in the array, and written to the failed disk data log 212 for every I/O. Thus, at least one read and one write operation are added to the overall I/O path in the RAID which can cause performance issues. With respect to the recovery journal 213, an extra read operation is added to each I/O when the parity data and written data are added to the recovery journal.

As an alternative approach to reduce the number of I/Os that are added to the I/O path of the RAID, the failed disk data log 212 and the recovery journal can be used in tandem. The thin RAID layer 103 may examine I/Os for data accesses associated with a failed disk such as the volume 111a. If the I/O is for a failed disk, then the thin RAID layer 103 may log the data associated with the cluster or portion of the failed disk identified in the I/O to the failed disk data log 212. Later, for the same or different I/O, before the thin disk layer 107 logs parity data and write data to the recovery journal 213, the thin disk layer 107 may determine if there is already entry for the stripe in the failed disk data log 212. If so, then the stripe can be closed using the failed disk data log 212 alone and there is no need to make the corresponding entry in the recovery journal 213. In the event of an unclean shutdown, the thin RAID layer 103 may close the open stripes with entries in the failed disk data log 212, and the thin disk layer 107 may close the open stripes in the recovery journal 213. Failed disk data log and active disk data log can be persisted to stable medium. The entire log data in stable medium is the recovery journal, and may be stored in the volumes 111a-111d, for example. In the event of failure of both primary and secondary RAID controllers, the log data available in the recovery journal can be used to close the stripes. For example, the active disk data log is played on top of thin disk layer and the failed disk data log is played over thin RAID layer.

Figure 3:
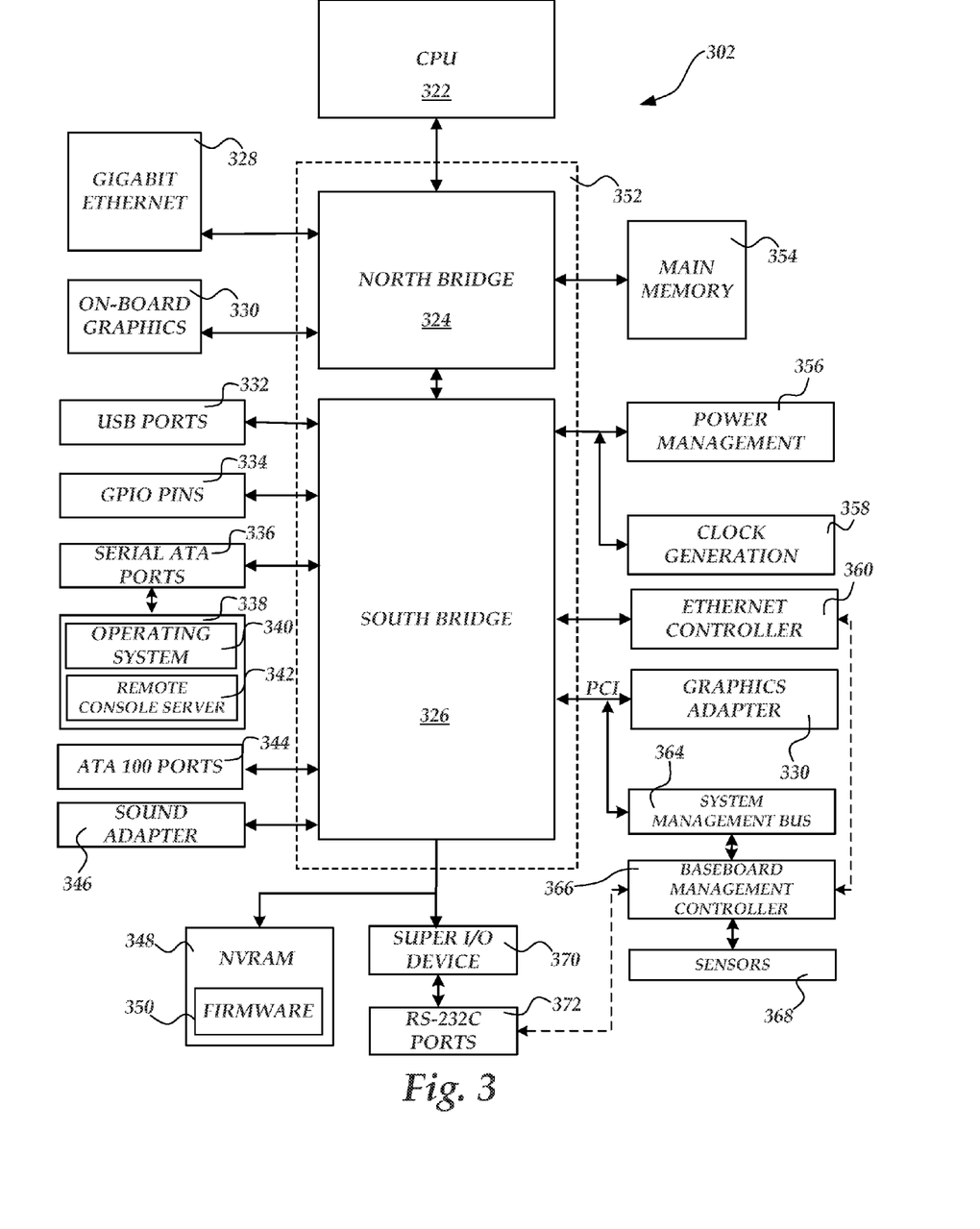
FIG. 3 is a computer architecture diagram showing an illustrative computer hardware architecture for a storage node computing system capable of implementing aspects of the embodiments presented herein.

FIG. 3 shows an illustrative computer architecture for a computer 300 capable of executing the software components described herein. In particular, the computer architecture shown in FIG. 3 provides a simplified view of the architecture of a conventional computer.

FIG. 3 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The server computer 302 includes a baseboard, or "motherboard", which is a printed circuit board to which a multitude of components or devices may be connected by way of a system bus or other electrical communication path. In one illustrative embodiment, a CPU 322 operates in conjunction with a chipset 352. The CPU 322 is a standard central processor that performs arithmetic and logical operations necessary for the operation of the computer. The server computer 302 may include a multitude of CPUs 322.

The chipset 352 includes a north bridge 324 and a south bridge 326. The north bridge 324 provides an interface between the CPU 322 and the remainder of the computer 302. The north bridge 324 also provides an interface to a random access memory ("RAM") used as the main memory 354 in the computer 302 and, possibly, to an on-board graphics adapter 330. The north bridge 324 may also include functionality for providing networking functionality through a gigabit Ethernet adapter 328. The gigabit Ethernet adapter 328 is capable of connecting the computer 302 to another computer via a network. Connections which may be made by the network adapter 328 may include LAN or WAN connections. LAN and WAN networking environments are commonplace in offices, enterprise-wide computer networks, intranets, and the internet. The north bridge 324 is connected to the south bridge 326.

The south bridge 326 is responsible for controlling many of the input/output functions of the computer 302. In particular, the south bridge 326 may provide one or more universal serial bus ("USB") ports 332, a sound adapter 346, an Ethernet controller 360, and one or more general purpose input/output ("GPIO") pins 334. The south bridge 326 may also provide a bus for interfacing peripheral card devices such as a graphics adapter 362. In one embodiment, the bus comprises a peripheral component interconnect ("PCI") bus. The south bridge 326 may also provide a system management bus 364 for use in managing the various components of the computer 302. Additional details regarding the operation of the system management bus 364 and its connected components are provided below.

The south bridge 326 is also operative to provide one or more interfaces for connecting mass storage devices to the computer 302. For instance, according to an embodiment, the south bridge 326 includes a serial advanced technology attachment ("SATA") adapter for providing one or more serial ATA ports 336 and an ATA 100 adapter for providing one or more ATA 100 ports 344. The serial ATA ports 336 and the ATA 100 ports 344 may be, in turn, connected to one or more mass storage devices storing an operating system 340 and application programs, such as the SATA disk drive 338. As known to those skilled in the art, an operating system 340 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 340 comprises the LINUX operating system. According to another embodiment of the invention the operating system 340 comprises the WINDOWS SERVER operating system from MICROSOFT CORPORATION. According to another embodiment, the operating system 340 comprises the UNIX or SOLARIS operating system. It should be appreciated that other operating systems may also be utilized.

The mass storage devices connected to the south bridge 326, and their associated computer-readable media, provide non-volatile storage for the computer 302. Although the description of computer-readable media contained herein refers to a mass storage device, such as a hard disk or CD-ROM drive, it should be appreciated by those skilled in the art that computer-readable media can be any available media that can be accessed by the computer 302. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 326 for connecting a "Super I/O" device 370. The Super I/O device 370 is responsible for providing a number of input/output ports, including a keyboard port, a mouse port, a serial interface 372, a parallel port, and other types of input/output ports. The LPC interface may also connect a computer storage media such as a ROM or a flash memory such as a NVRAM 348 for storing the firmware 350 that includes program code containing the basic routines that help to start up the computer 302 and to transfer information between elements within the computer 302.

As described briefly above, the south bridge 326 may include a system management bus 364. The system management bus 364 may include a BMC 366. In general, the BMC 366 is a microcontroller that monitors operation of the computer system 302. In a more specific embodiment, the BMC 366 monitors health-related aspects associated with the computer system 302, such as, but not limited to, the temperature of one or more components of the computer system 302, speed of rotational components (e.g., spindle motor, CPU Fan, etc.) within the system, the voltage across or applied to one or more components within the system 302, and the available or used capacity of memory devices within the system 302. To accomplish these monitoring functions, the BMC 366 is communicatively connected to one or more components by way of the management bus 364. In an embodiment, these components include sensor devices for measuring various operating and performance-related parameters within the computer system 302. The sensor devices may be either hardware or software based components configured or programmed to measure or detect one or more of the various operating and performance-related parameters. The BMC 366 functions as the master on the management bus 364 in most circumstances, but may also function as either a master or a slave in other circumstances. Each of the various components communicatively connected to the BMC 366 by way of the management bus 364 is addressed using a slave address. The management bus 364 is used by the BMC 366 to request and/or receive various operating and performance-related parameters from one or more components, which are also communicatively connected to the management bus 364.

It should be appreciated that the computer 302 may comprise other types of computing devices, including hand-held computers, embedded computer systems, personal digital assistants, and other types of computing devices known to those skilled in the art. It is also contemplated that the computer 302 may not include all of the components shown in FIG. 3, may include other components that are not explicitly shown in FIG. 3, or may utilize an architecture completely different than that shown in FIG. 3.

Based on the foregoing, it should be appreciated that technologies for providing networked RAID in a virtualized storage cluster are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for maintaining data consistency in a RAID array including a primary storage controller of a storage cluster and a secondary storage controller of the storage cluster, the method comprising:
   intercepting a write I/O operation directed to a stripe in the storage cluster at the primary storage controller;
   upon intercepting the write I/O operation, logging the stripe in a first open stripe table maintained in memory of the primary storage controller;
   communicating changes in the first open stripe table to the secondary storage controller;
   upon receiving the changes in the first open stripe table, logging the stripe in a second open stripe table maintained in memory of the secondary storage controller;
   determining whether the stripe is an open stripe based on the first open stripe table; and
   upon determining that the stripe is an open stripe, waiting for the stripe to close before fulfilling the write I/O operation.

2. The method of claim 1, further comprising:
   upon fulfilling the write I/O operation, clearing the stripe from the first open stripe table maintained in the memory of the primary storage controller;
   communicating changes in the first open stripe table to the secondary storage controller; and
   upon receiving the changes in the first open stripe table, clearing the stripe from the second open stripe table maintained in the memory of the secondary storage controller.

3. The method of claim 1, wherein logging the stripe in the first open stripe table further comprises logging a copy of the stripe before fulfillment of the write I/O operation.

4. The method of claim 1, wherein the first open stripe table is maintained in memory of the storage cluster.

5. The method of claim 1, further comprising:
   taking ownership of the RAID array with the secondary storage controller upon failure of the primary storage controller;
   determining whether the stripe targeted by the write I/O is an open stripe based on the second open storage table; and
   upon determining that the stripe targeted by the write I/O operation is an open stripe, closing the stripe targeted by the write I/O operation, wherein closing the stripe transforms the RAID array from an inconsistent state to a consistent state.

6. The method of claim 1, further comprising:
   upon intercepting the write I/O operation when the RAID array is in a degraded mode, retrieving a missing data strip from the RAID array corresponding to the stripe targeted by the write I/O operation;
   logging the missing data strip in a first failed disk data log maintained in the memory of the primary storage controller;
   communicating changes in the first failed disk data log to the secondary storage controller;
   upon receiving changes in the first failed disk data log, logging the missing data strip in a second failed disk data log maintained in the memory of the secondary storage controller;
   taking ownership of the RAID array with the secondary storage controller upon failure of the primary storage controller;
   determining whether the stripe targeted by the write I/O operation is an open stripe based on the second open stripe table; and
   upon determining that the stripe targeted by the write I/O operation is an open stripe, closing the stripe targeted by the write I/O operation using the missing strip logged in the second failed disk data log, wherein closing the stripe transforms the RAID array from an inconsistent state to a consistent state.

7. The method of claim 1, further comprising:
   upon intercepting the write I/O operation when the RAID array is in a degraded mode, calculating a new parity value for the stripe;
   logging the new parity value for the stripe and data associated with the write I/O operation in a first recovery journal maintained in the memory of the primary storage controller;
   communicating changes in the first recovery journal to the secondary storage controller;
   upon receiving changes in the first recovery journal, logging the new parity value for the stripe and the data associated with the write I/O operation in a second recovery journal maintained in the memory of the secondary storage controller;
   taking ownership of the RAID array with the secondary storage controller upon failure of the primary storage controller;
   determining whether the stripe targeted by the write I/O operation is an open stripe based on the secondary open stripe table; and
   upon determining that the stripe targeted by the write I/O operation is an open stripe, closing the stripe targeted by the write I/O operation using the new parity value for the stripe and the data associated with the write I/O operation logged in the second recovery journal, wherein closing the stripe transforms the RAID array from an inconsistent state to a consistent state.

8. The method of claim 1, further comprising:
   upon intercepting the write I/O operation when the RAID array is in a degraded mode, determining whether the write I/O is directed to a stripe including a missing data strip;
   upon determining that the write I/O operation is directed to a stripe including a missing data strip, retrieving the missing data strip and logging the missing data strip in a first failed disk data log maintained in the memory of the primary storage controller;
   upon determining that the write I/O operation is not directed to a stripe including a missing data strip, calculating a new parity value for the stripe and logging the new parity value for the stripe and data associated with the write I/O operation in a first recovery journal maintained in the memory of the primary storage controller;

communicating changes in the first failed disk data log and the first recovery journal to the secondary storage controller;

upon receiving changes in first failed disk data log and the first recovery journal, logging the missing data strip in a second failed disk data log maintained in the memory of the secondary storage controller and logging the new parity value for the stripe and the data associated with the write I/O operation in a second recovery journal maintained in the memory of the secondary storage controller;

taking ownership of the RAID array with the secondary storage controller upon failure of the primary storage controller;

determining whether the stripe targeted by the write I/O operation is an open stripe based on the secondary open stripe table; and upon determining that the stripe targeted by the write I/O operation is an open stripe:

closing the stripe targeted by the write I/O operation using the missing data strip logged in the second failed disk data log when write I/O operation is directed to a stripe including a missing data strip; and closing the stripe targeted by the write I/O operation using the new parity value for the stripe and the data associated with the write I/O operation logged in the second recovery journal when write I/O operation is not directed to a stripe including a missing data strip, wherein closing the stripe transforms the RAID array from an inconsistent state to a consistent state.

9. A non-transitory computer-readable medium having computer-executable instructions stored thereon that, when executed by a primary storage controller of a storage cluster including the primary storage controller and a secondary storage controller, cause the primary storage controller to:

intercept a write I/O operation directed to a stripe in the storage cluster;

upon intercepting the write I/O operation, log the stripe in a first open stripe table maintained in memory of the primary storage controller;

communicate changes in the first open stripe table to the secondary storage controller; and fulfill the write I/O operation, the non-transitory computer-readable medium having further computer-executable instructions stored thereon that, when executed by the secondary storage controller of the storage cluster, cause the secondary storage controller to:

upon receiving the changes in the first open stripe table, log the stripe in a second open stripe table maintained in memory of the secondary storage controller;

take ownership of a RAID array upon failure of the primary storage controller;

determine whether the stripe targeted by the write I/O is an open stripe based on the second open storage table; and upon determining that the stripe targeted by the write I/O operation is an open stripe, close the stripe targeted by the write I/O operation, wherein closing the stripe transforms the RAID array from an inconsistent state to a consistent state.

10. The non-transitory computer-readable medium of claim 9, having further computer-executable instructions stored thereon that, when executed by the primary storage controller, cause the primary storage controller to:

upon fulfilling the write I/O operation, clear the stripe from the first open stripe table maintained in the memory of the primary storage controller; and communicate changes in the first open stripe table to the secondary storage controller, the non-transitory computer-readable medium having further computer-executable instructions stored thereon that, when executed by the secondary storage controller of the storage cluster, cause the secondary storage controller to:

upon receiving the changes in the first open stripe table, clear the stripe from the second open stripe table maintained in the memory of the secondary storage controller.

11. The non-transitory computer-readable medium of claim 9, having further computer-executable instructions stored thereon that, when executed by the primary storage controller, cause the primary storage controller to:

upon intercepting the write I/O operation when the RAID array is in a degraded mode, retrieve a missing data strip from the RAID array corresponding to the stripe targeted by the write I/O operation;

log the missing data strip in a first failed disk data log maintained in the memory of the primary storage controller; and communicate changes in the first failed disk data log to the secondary storage controller, the non-transitory computer-readable medium having further computer-executable instructions stored thereon that, when executed by the secondary storage controller of the storage cluster, cause the secondary storage controller to:

upon receiving changes in the first failed disk data log, log the missing data strip in a second failed disk data log maintained in the memory of the secondary storage controller;

take ownership of the RAID array upon failure of the primary storage controller;

determine whether the stripe targeted by the write I/O operation is an open stripe based on the second open stripe table; and upon determining that the stripe targeted by the write I/O operation is an open stripe, close the stripe targeted by the write I/O operation using the missing strip logged in the second failed disk data log, wherein closing the stripe transforms the RAID array from an inconsistent state to a consistent state.

12. The non-transitory computer-readable medium of claim 9, having further computer-executable instructions stored thereon that, when executed by the primary storage controller, cause the primary storage controller to:

upon intercepting the write I/O operation when the RAID array is in a degraded mode, calculate a new parity value for the stripe;

log the new parity value for the stripe and data associated with the write I/O operation in a first recovery journal maintained in the memory of the primary storage controller; and communicate changes in the first recovery journal to the secondary storage controller, the non-transitory computer-readable medium having further computer-executable instructions stored thereon that, when executed by the secondary storage controller of the storage cluster, cause the secondary storage controller to:

upon receiving changes in the first recovery journal, log the new parity value for the stripe and the data associated with the write I/O operation in a second recovery journal maintained in the memory of the secondary storage controller;

take ownership of the RAID array upon failure of the primary storage controller;

determine whether the stripe targeted by the write I/O operation is an open stripe based on the secondary open stripe table; and upon determining that the stripe targeted by the write I/O operation is an open stripe, close the stripe targeted by the write I/O operation using the new parity value for the stripe and the data associated with the write I/O operation logged in the second recovery journal, wherein closing the stripe transforms the RAID array from an inconsistent state to a consistent state.

13. The non-transitory computer-readable medium of claim 9, having further computer-executable instructions stored thereon that, when executed by the primary storage controller, cause the primary storage controller to:

upon intercepting the write I/O operation when the RAID array is in a degraded mode, determine whether the write I/O is directed to a stripe including a missing data strip;

upon determining that the write I/O operation is directed to a stripe including a missing data strip, retrieve the missing data strip and log the missing data strip in a first failed disk data log maintained in the memory of the primary storage controller;

upon determining that the write I/O operation is not directed to a stripe including a missing data strip, calculate a new parity value for the stripe and log the new parity value for the stripe and data associated with the write I/O operation in a first recovery journal maintained in the memory of the primary storage controller; and communicate changes in the first failed disk data log and the first recovery journal to the secondary storage controller, the non-transitory computer-readable medium having further computer-executable instructions stored thereon that, when executed by the secondary storage controller of the storage cluster, cause the secondary storage controller to:

upon receiving changes in first failed disk data log and the first recovery journal, log the missing data strip in a second failed disk data log maintained in the memory of the secondary storage controller and log the new parity value for the stripe and the data associated with the write I/O operation in a second recovery journal maintained in the memory of the secondary storage controller;

take ownership of the RAID array upon failure of the primary storage controller;

determine whether the stripe targeted by the write I/O operation is an open stripe based on the secondary open stripe table; and upon determining that the stripe targeted by the write I/O operation is an open stripe:

close the stripe targeted by the write I/O operation using the missing data strip logged in the second failed disk data log when write I/O operation is directed to a stripe including a missing data strip; and close the stripe targeted by the write I/O operation using the new parity value for the stripe and the data associated with the write I/O operation logged in the second recovery journal when write I/O operation is not directed to a stripe including a missing data strip, wherein closing the stripe transforms the RAID array from an inconsistent state to a consistent state.

14. A system for maintaining data consistency in a RAID array including a primary storage controller of a storage cluster and a secondary storage controller of the storage cluster, the system comprising:

a primary storage controller including a processing unit and a memory communicatively connected to the processing unit, the primary storage controller being configured to:

intercept a write I/O operation directed to a stripe in the storage cluster;

upon intercepting the write I/O operation, log the stripe in a first open stripe table maintained in the memory of the primary storage controller;

communicate changes in the first open stripe table to the secondary storage controller; and fulfill the write I/O operation; and a secondary storage controller including a processing unit and a memory communicatively connected to the processing unit, the secondary storage controller being configured to:

upon receiving the changes in the first open stripe table, log the stripe in a second open stripe table maintained in the memory of the secondary storage controller;

take ownership of the RAID array upon failure of the primary storage controller;

determine whether the stripe targeted by the write I/O is an open stripe based on the second open storage table; and upon determining that the stripe targeted by the write I/O operation is an open stripe, close the stripe targeted by the write I/O operation, wherein closing the stripe transforms the RAID array from an inconsistent state to a consistent state.

15. The system of claim 14, wherein the primary storage controller is further configured to:

upon intercepting the write I/O operation when the RAID array is in a degraded mode, retrieve a missing data strip from the RAID array corresponding to the stripe targeted by the write I/O operation;

log the missing data strip in a first failed disk data log maintained in the memory of the primary storage controller; and communicate changes in the first failed disk data log to the secondary storage controller, and the secondary storage controller is further configured to:

upon receiving changes in the first failed disk data log, log the missing data strip in a second failed disk data log maintained in the memory of the secondary storage controller;

take ownership of the RAID array upon failure of the primary storage controller;

determine whether the stripe targeted by the write I/O operation is an open stripe based on the second open stripe table; and upon determining that the stripe targeted by the write I/O operation is an open stripe, close the stripe targeted by the write I/O operation using the missing strip logged in the second failed disk data log, wherein closing the stripe transforms the RAID array from an inconsistent state to a consistent state.

16. The system of claim 14, wherein the primary storage controller is further configured to:

upon intercepting the write I/O operation when the RAID array is in a degraded mode, calculate a new parity value for the stripe;

log the new parity value for the stripe and data associated with the write I/O operation in a first recovery journal maintained in the memory of the primary storage controller; and communicate changes in the first recovery journal to the secondary storage controller; and the secondary storage controller is further configured to:
upon receiving changes in the first recovery journal, log the new parity value for the stripe and the data associated with the write I/O operation in a second recovery journal maintained in the memory of the secondary storage controller;
take ownership of the RAID array upon failure of the primary storage controller;
determine whether the stripe targeted by the write I/O operation is an open stripe based on the secondary open stripe table; and
upon determining that the stripe targeted by the write I/O operation is an open stripe, close the stripe targeted by the write I/O operation using the new parity value for the stripe and the data associated with the write I/O operation logged in the second recovery journal, wherein closing the stripe transforms the RAID array from an inconsistent state to a consistent state.

17. The system of claim 14, wherein the primary storage controller is further configured to:
upon intercepting the write I/O operation when the RAID array is in a degraded mode, determine whether the write I/O is directed to a stripe including a missing data strip;
upon determining that the write I/O operation is directed to a stripe including a missing data strip, retrieve the missing data strip and log the missing data strip in a first failed disk data log maintained in the memory of the primary storage controller;
upon determining that the write I/O operation is not directed to a stripe including a missing data strip, calculate a new parity value for the stripe and log the new parity value for the stripe and data associated with the write I/O operation in a first recovery journal maintained in the memory of the primary storage controller; and
communicate changes in the first failed disk data log and the first recovery journal to the secondary storage controller; and
the secondary storage controller is further configured to:
upon receiving changes in first failed disk data log and the first recovery journal, log the missing data strip in a second failed disk data log maintained in the memory of the secondary storage controller and log the new parity value for the stripe and the data associated with the write I/O operation in a second recovery journal maintained in the memory of the secondary storage controller;
take ownership of the RAID array upon failure of the primary storage controller;
determine whether the stripe targeted by the write I/O operation is an open stripe based on the secondary open stripe table; and
upon determining that the stripe targeted by the write I/O operation is an open stripe:
close the stripe targeted by the write I/O operation using the missing data strip logged in the second failed disk data log when write I/O operation is directed to a stripe including a missing data strip; and
close the stripe targeted by the write I/O operation using the new parity value for the stripe and the data associated with the write I/O operation logged in the second recovery journal when write I/O operation is not directed to a stripe including a missing data strip, wherein closing the stripe transforms the RAID array from an inconsistent state to a consistent state.

* * * * *